United States Patent [19]

Tanoue et al.

[11] Patent Number: 5,359,585
[45] Date of Patent: Oct. 25, 1994

[54] INFORMATION REPRODUCING APPARATUS WITH VARIABLE DIGITIZING THRESHOLD

[75] Inventors: Koki Tanoue; Tomohisa Yoshimaru, both of Yokohama; Sueo Ueno, Kawasaki, all of Japan

[73] Assignee: Kabushiki Kaisha Toshiba, Kawasaki, Japan

[21] Appl. No.: 953,157

[22] Filed: Sep. 29, 1992

[30] Foreign Application Priority Data

Sep. 30, 1991 [JP] Japan .................................. 3-250668

[51] Int. Cl.$^5$ .................................................. G11B 7/00
[52] U.S. Cl. ............................................ 369/59; 369/48
[58] Field of Search ................... 369/59, 54, 58, 44.32, 369/48, 124; 360/51, 48, 46, 53

[56] References Cited

U.S. PATENT DOCUMENTS

| | | | |
|---|---|---|---|
| 4,672,596 | 6/1987 | Romeas et al. | 369/59 |
| 4,706,236 | 11/1987 | Yoda | 369/59 |
| 5,105,417 | 4/1992 | Matsueda et al. | 369/59 |
| 5,189,650 | 2/1993 | Watanabe et al. | 369/116 |
| 5,204,848 | 4/1993 | Cardero et al. | 369/59 |
| 5,237,554 | 8/1993 | Senshu et al. | 369/59 |

FOREIGN PATENT DOCUMENTS

| | | |
|---|---|---|
| 59-152512 | 8/1984 | Japan . |
| 63-197062 | 8/1988 | Japan . |
| 1-50995 | 11/1989 | Japan . |
| 2-81368 | 3/1990 | Japan . |
| 2-94916 | 4/1990 | Japan . |
| 4-212723 | 8/1992 | Japan . |

Primary Examiner—Aristotelis Psitos
Assistant Examiner—P. W. Huber
Attorney, Agent, or Firm—Finnegan, Henderson, Farabow, Garrett & Dunner

[57] ABSTRACT

The present invention aims at preventing erroneous data reproduction even when the amplitude center of a signal of a data part read out from an optical disc is displaced. An information reproducing apparatus comprises read means for reading data stored in each of block units on an optical disc and outputting a read signal, digitizing means for digitizing the read signal by using a slice level, generating means for comparing the signal digitized by the digitizing means and clock signals output at predetermined intervals, thereby generating a charge width signal representing a phase difference between the digitized signal and the clock signals, while the data stored in a data storing portion of the block unit is read by the read means, and changing means for changing the slice level of the digitizing means on the basis of the charge width signal generated by the generating means.

15 Claims, 11 Drawing Sheets

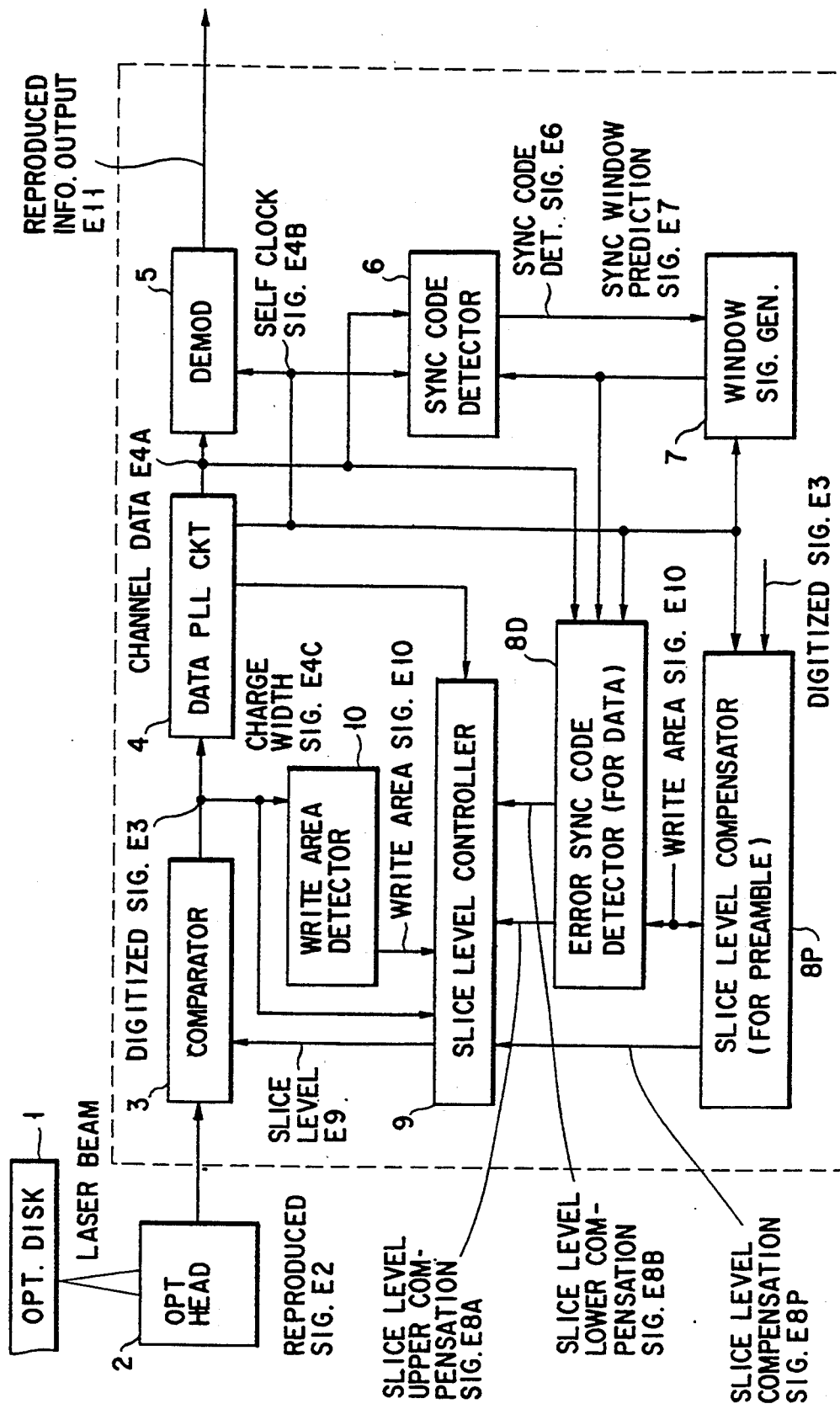
F I G. 1

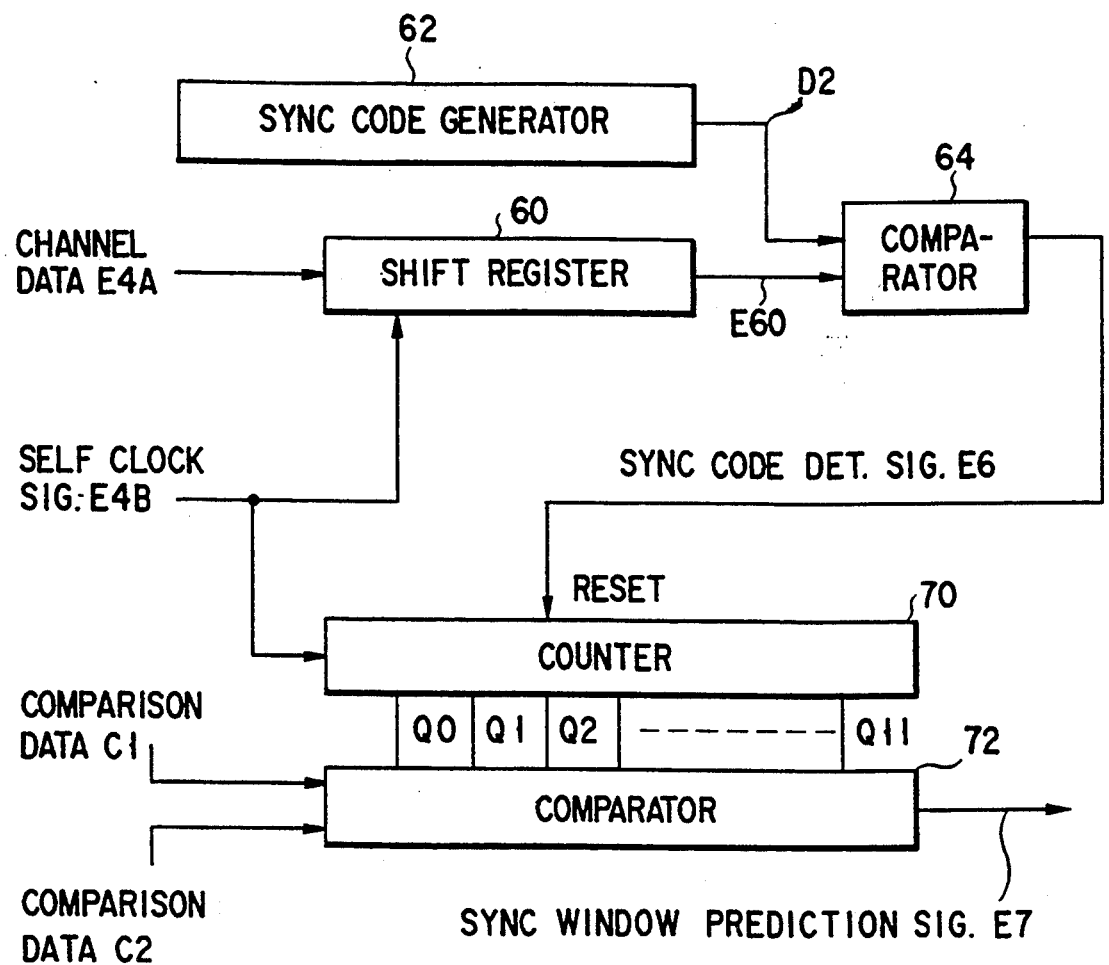
F I G. 2
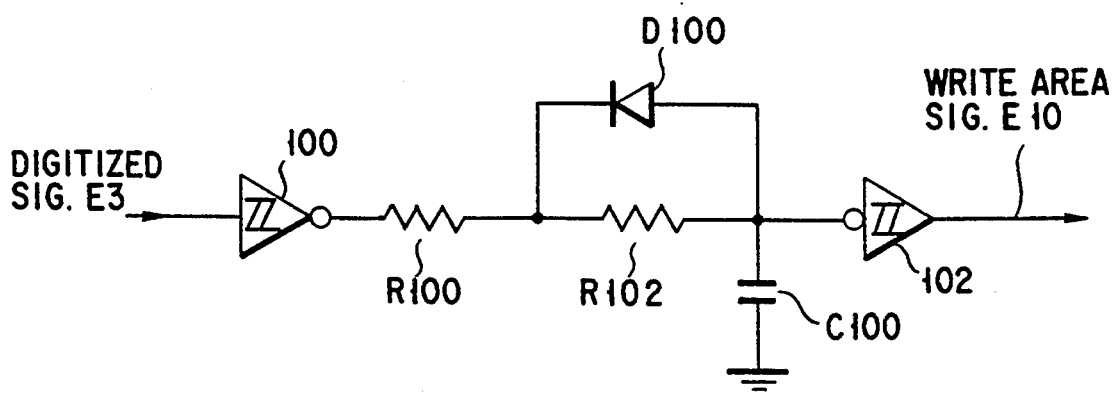
F I G. 3

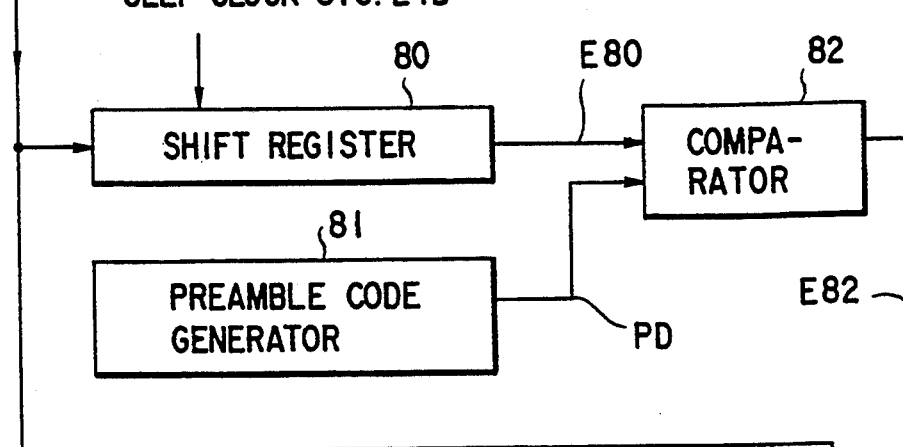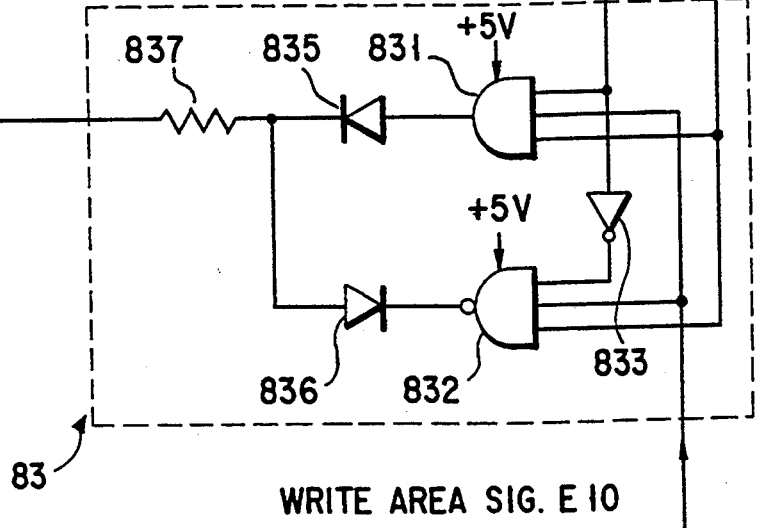
FIG. 4

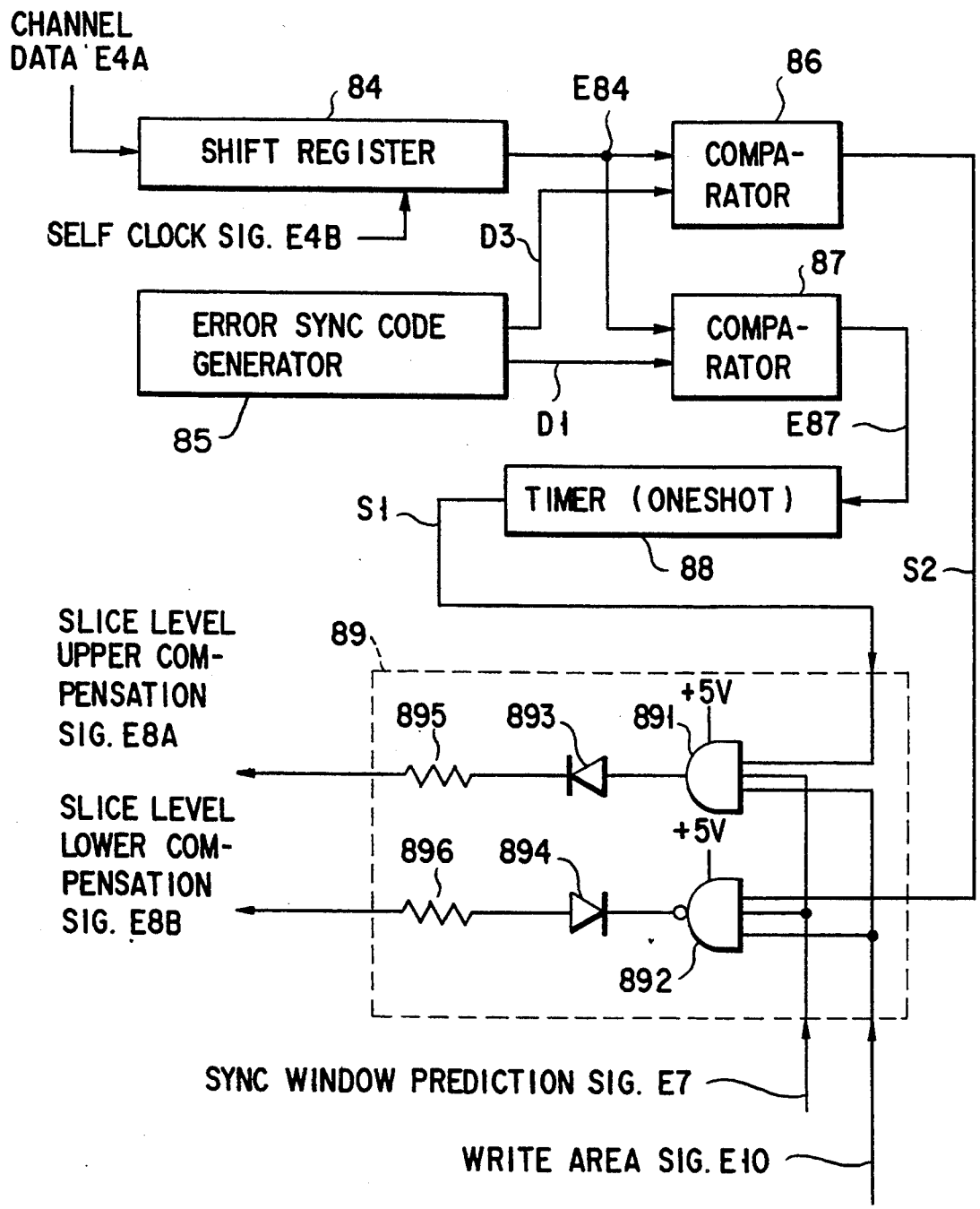
F I G. 5

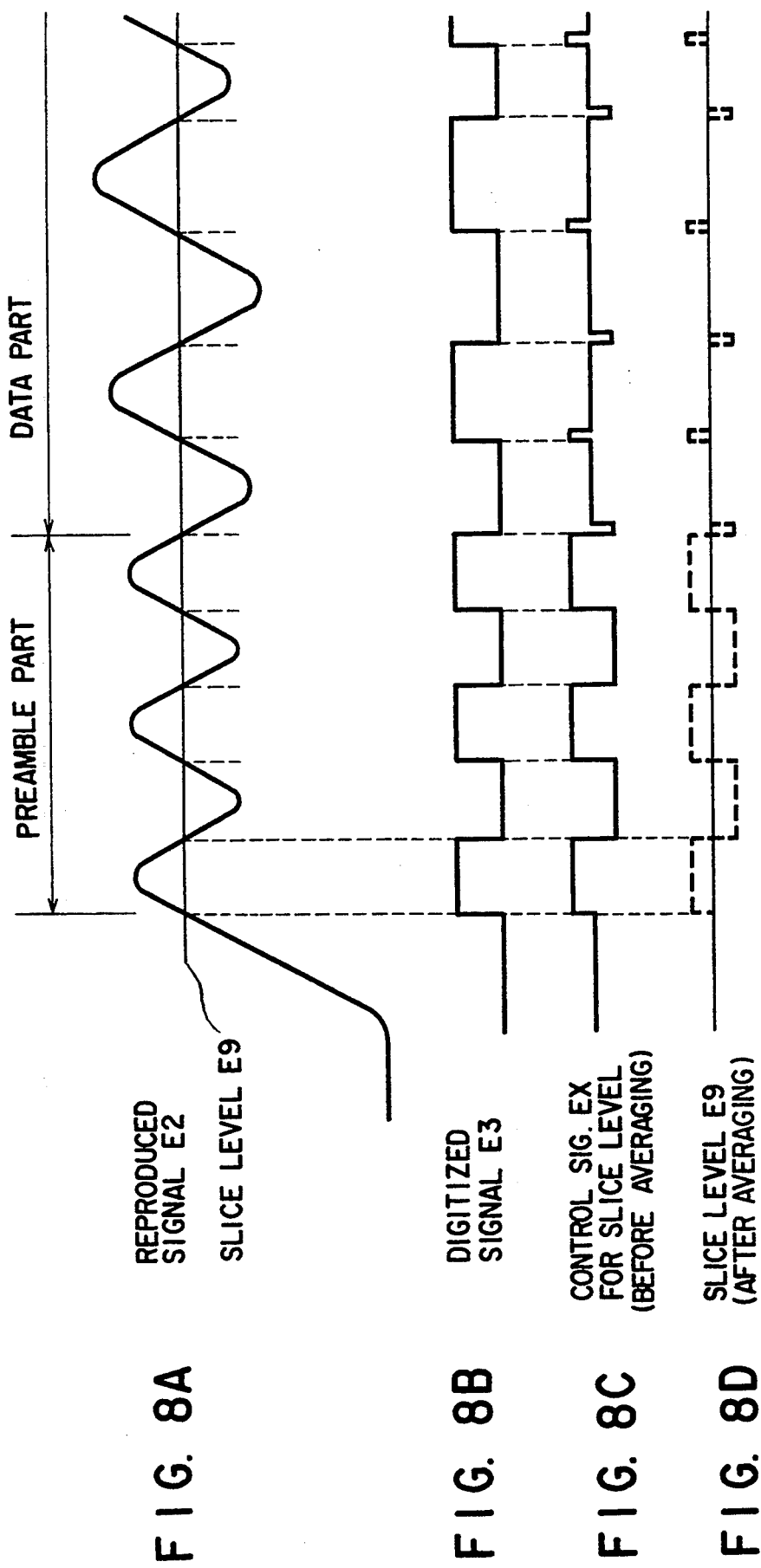

F I G. 9A  REPRODUCED SIG. E2 OF PREAMBLE PART
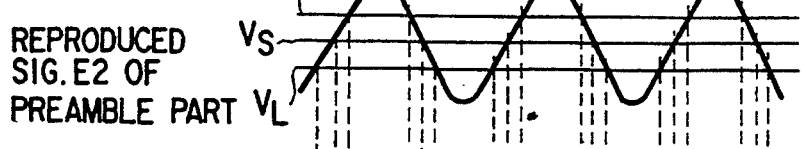
F I G. 9B  DIGITIZED SIG. E2
F I G. 9C  CONTROL SIG. EX FOR SLICE LEVEL
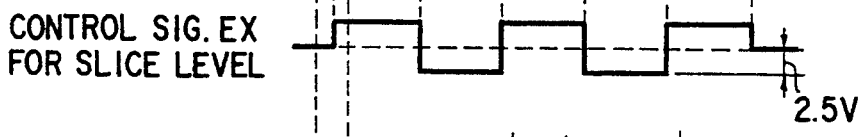
2.5V
F I G. 9D  DIGITIZED SIG. E3
F I G. 9E  CONTROL SIG. EX FOR SLICE LEVEL
LESS THAN 2.5V
F I G. 9F  DIGITIZED SIG. E3
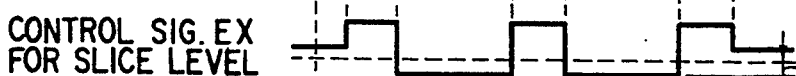
F I G. 9G  CONTROL SIG. EX FOR SLICE LEVEL
LARGER THAN 2.5V

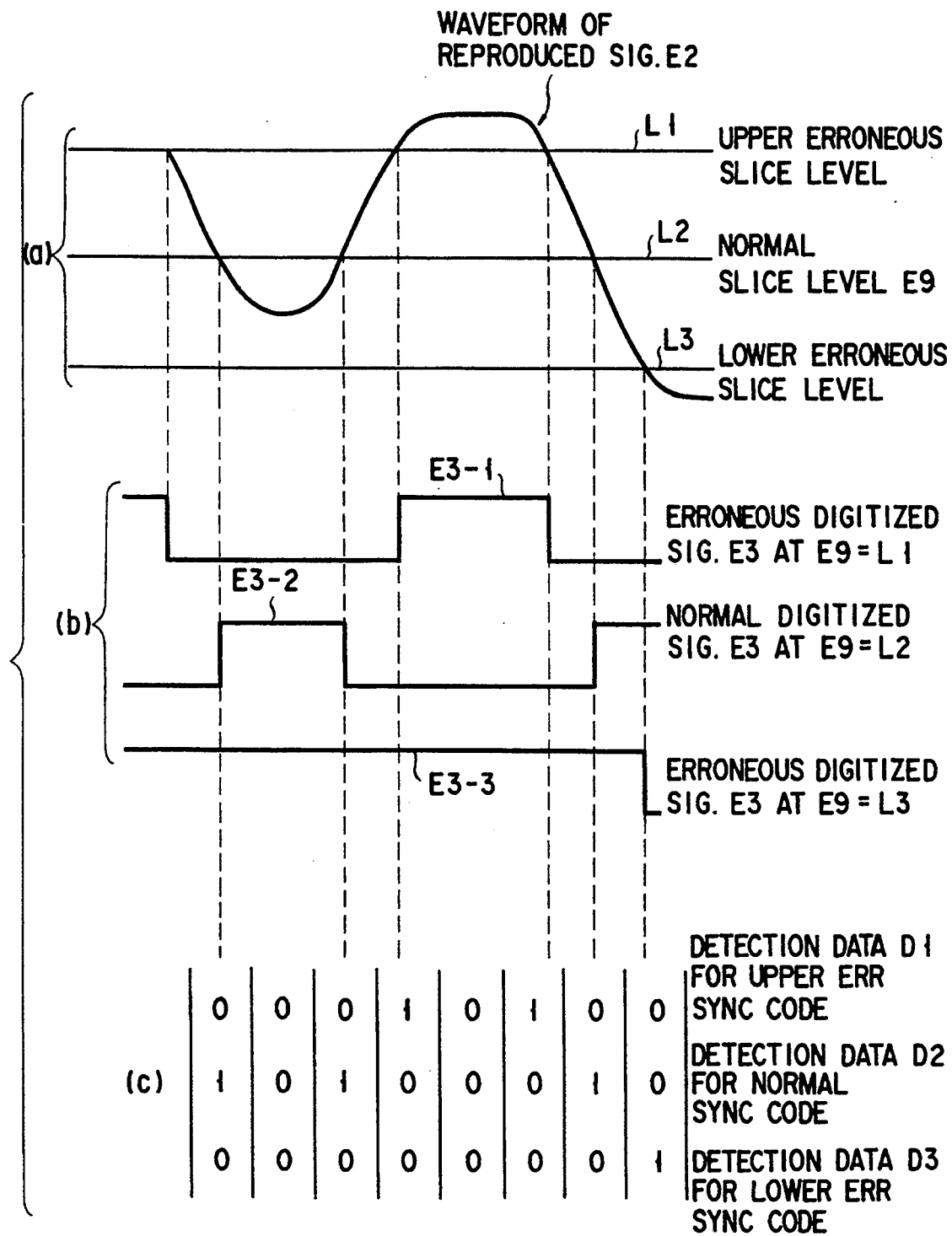
F I G. 11

INFORMATION REPRODUCING APPARATUS WITH VARIABLE DIGITIZING THRESHOLD

BACKGROUND OF THE INVENTION

1. Field of the Invention

The present invention relates to an information reproducing apparatus for reproducing information recorded on an optical disc by a mark-length recording system.

2. Description of the Related Art

Recently, optical discs in which information is recorded by a mark-length recording system have been put to practical use. According to this recording system, a block unit including a preamble part and a data part is used as a unit, and a number of block units are used for information recording. The preamble part stores a predetermined code for synchronizing the block units, and the data part stores recording data and a sync code.

There has been proposed an appartus (Japanese Patent Application No. 2-201533/90), wherein when information is reproduced from the optical disc, an average value of detection signals of the preamble portions recorded on the optical disc is found, and, on the basis of a slice level determined by the average value, the data part is digitized at a center level of the amplitude tude of the preamble part.

This apparatus exactly detects the pit width and the interval between pits and prevents erroneous data reproduction, even when a laser reflection light amount from the optical disc varies due to a focal offset of the optical head, a variation in film sensitivity of the optical disc, a variation in laser intensity, a distor tion in analog circuits and digitizing circuits, etc.

In this apparatus, however, erroneous reproduction cannot be prevented when the center of amplitude of the data part is displaced.

SUMMARY OF THE INVENTION

The object of the present invention is to provide an information reproducing apparatus capable of preventing erroneous data reproduction even when the amplitude center of a signal of the data part is displaced, among information read out from the optical disc.

According to the present invention, there is provided an information reproducing apparatus comprising:

read means for reading data stored in each of block units of a recording medium (an optical disc) and outputting a read signal;

digitizing means for digitizing the read signal by using a slice level;

generating means for comparing the signal digitized by the digitizing means and clock signals output at predetermined intervals, thereby generating a charge width signal representing a phase difference between the digitized signal and the clock signals, while the data stored in a data storing portion of the block unit is read by the read means; and changing means for changing the slice level of the digitizing means on the basis of the charge width signal generated by the generating means.

Even if the amplitude center of the read signal of the data part is displaced, the slice level of the digitizing means is changed on the basis of the charge width signal generated at this time, thereby preventing erroneous data reproduction.

BRIEF DESCRIPTION OF THE DRAWINGS

FIG. 1 is a block diagram showing the structure of an information reproducing apparatus according to an embodiment of the present invention;

FIG. 2 is a block diagram showing a specific example of a sync code detection circuit and a window signal generating circuit shown in FIG. 1;

FIG. 3 is a circuit diagram showing a specific example of a write area detection circuit shown in FIG. 1;

FIG. 4 is a circuit diagram showing a specific example of a slice level correction circuit shown in FIG. 1;

FIG. 5 is a circuit diagram showing a specific example of an erroneous sync code detection circuit shown in FIG. 1;

FIGS. 8A to 8D illustrate the relationship between a waveform of a reproduction signal read out from the optical disc shown in FIG. 1, a slice level control signal waveform, and a slice level;

FIGS. 9A to 9G illustrate the relationship between a waveform of a preamble part of a reproduction signal read out from the optical disc shown in FIG. 1, a digitized signal waveform thereof, and a slice level control signal waveform;

FIG. 11 is a waveform figure for explaining what digitized signal is obtained when the amplitude of a reproduction signal read out from the optical disc shown in FIG. 1 varies greatly and the slice level departs upward or downward from a normal level.

DETAILED DESCRIPTION OF THE PREFERRED EMBODIMENTS

Figure 6:
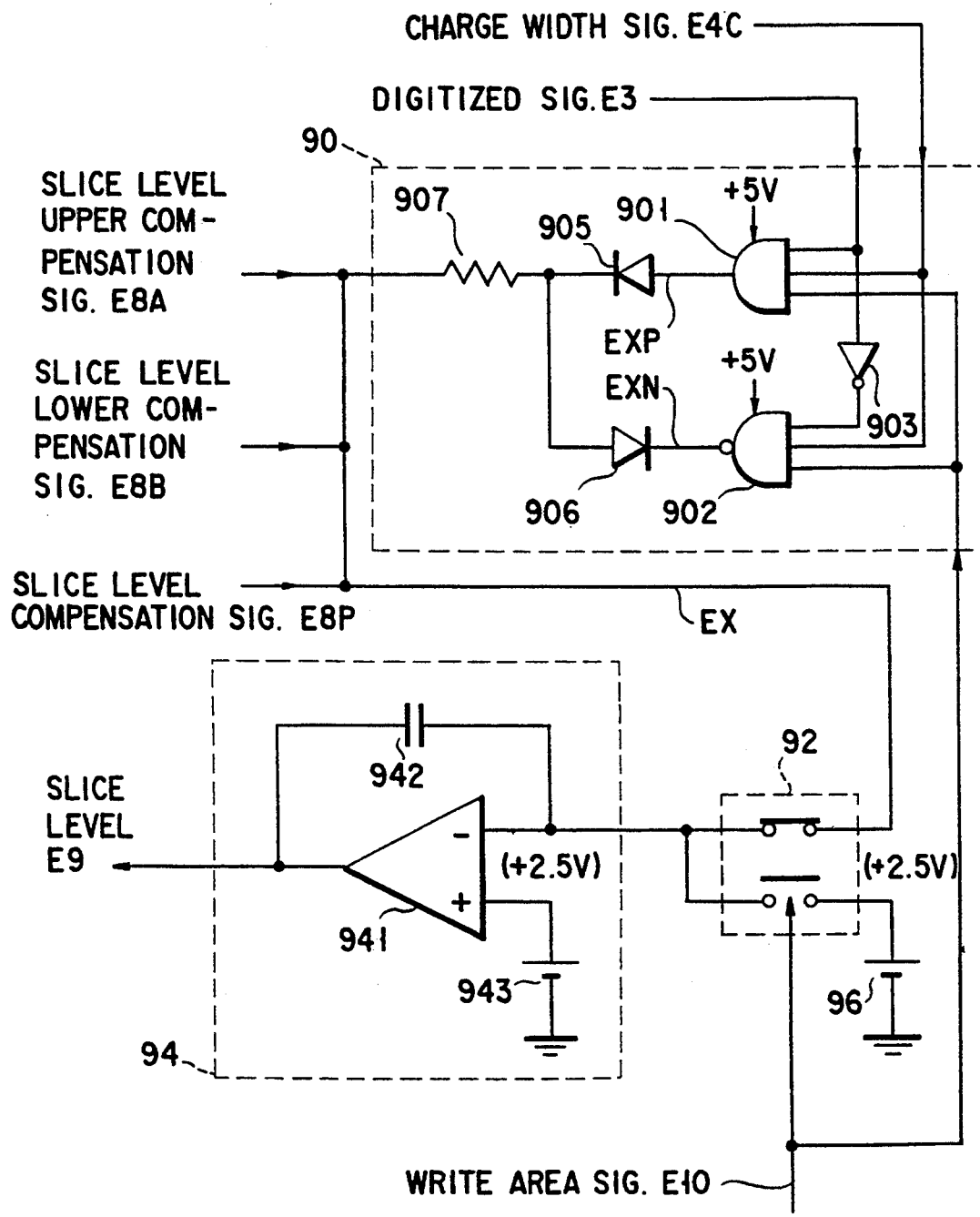
FIG. 6 is a circuit diagram showing a specific example of a slice level control circuit shown in FIG. 1.

Preferred embodiments of the invention will be described with reference to the accompanying drawings.

FIG. 1 shows a configuration of an information reproducing apparatus according to the present invention. In this embodiment, information having a format of FIG. 7A is reproduced from optical disk 1.

The information of optical disk 1 is recorded on a group of serially-arranged blocks as shown in the upper portion of FIG. 7A. The leading portion of each of the blocks is provided with a preamble part which is formed of a "1010" pattern of 15 bytes, for example. The preamble part can be discriminated by reading a part of 5 bytes from the 15 bytes pattern. A synchronization for each block can be achieved by detecting the preamble part. Each block is also provided with a data part in which a plurality of sync codes and data are arranged alternatively. The data in the data part is constituted by 57 bytes of data, and the sync code therein is constituted by 1.5 bytes, for example.

The embodiment of FIG. 1 includes the following three features:

(1) In the digitizing process of the preamble part at the leading portion of the block, the slice level for digitization is determined in accordance with an average of the digitized signal (i.e., the slice level=an average level);

(2) In the digitizing process of the data part of the block, a charge width signal representing the phase difference between given clock signals and the digitized signal is detected, and the slice level for digitization is determined in accordance with the charge width signal so that the charge width signal is decreased (i.e., the above-mentioned phase difference is reduced); and (3) In the digitizing process of the data part of the block, when a code (error sync code) being different from a normal sync code is read from optical disk 1 at the portion of the sync codes which are contained in the data of each block with a predetermined interval (e.g., 58.5 bytes interval), then the slice level is changed by a predetermined amount, independently of the slice level control of the above (2). (That is, if the error sync code is read due to a much higher slice level, the slice level is decreased by the predetermined amount, and if the error sync code is read due to a much lower slice level, the slice level is increased by the predetermined amount.)

The embodiment which will be described below has all the feature of above (1), (2), and (3). However, the present invention can be reduced to practice wherein at least two of the above features (1), (2), and (3) are incorporated.

In the embodiment of FIG. 1, an information recording medium is represented by optical disk 1. Disk 1 is formed of, for example, a circular substrate of glass or plastic on which a doughnut-shaped metal film of Tellurium or Bismuth is coated. Near the center of the metal film of disk 1, a notch or a reference mark is provided.

On disk 1, an information recording track is formed spirally or coaxially. The information recording track is divided into 256 sectors ranging from "0" to "255", with the position of the reference mark as "0".

A plurality of information recording blocks each having a fixed length are provided on optical disk 1. The number of sectors of the information recording blocks varies depending on the location of the blocks on disk 1.

Recorded at the leading portion of each block is a block header (preamble part) containing a fixed code for, e.g., synchronization, a block number, a track number, and the like.

The synchronization code of the leading portion has a pattern (e.g., "1010" pattern of 5 bytes) with a predetermined bit length. This pattern has a specific period which is longer than a period of pits on optical disk 1 but shorter than a period of sectors thereon. The block header is pre-recorded on disk 1 at the time of manufacturing, and given information is recorded on areas (data part) subsequent to the block header.

Incidentally, if each block is not ended at the position corresponding to a boundary between the sectors, a prescribed block gap is inserted at this position so that each block can always start from the boundary corresponding position.

The above fixed code is formed of pits having a predetermined pit width and a predetermined pit interval, wherein a ratio of the pit width to the pit interval is set at 1:1, or at 1:n (n=the natural number of more than 1).

Optical disk 1 as mentioned above is mounted on a spindle motor (not shown), and disk 1 driven by the spindle motor is rotated with a prescribed speed. Optical head 2 is located under disk 1. Head 2 records information on disk 1, and reproduces the recorded information from disk 1.

Optical head 2 may be a conventional one which is formed of a semiconductor laser oscillator (not shown), a collimator lens (not shown), a beam splitter (not shown), an objective lens (not shown), an astigmatic optical system (not shown), a lens actuator (not shown), an optical detector (photo diodes) (not shown), and so on.

Optical head 2 is mounted on an actuator comprising a linear motor, for example, thereby allowing head 2 to move along the radial direction of optical disk 1. Thus, according to an instruction from a control circuit (not shown), optical head 2 is moved to a target track to which information is recorded or from which information is reproduced.

When a mark length information recording is to be effected on optical disk 2, said semiconductor laser oscillator of optical head 2 generates a laser beam whose optical intensity is modulated according to information to be recorded. When information is to be reproduced from disk 1, this oscillator generates a laser beam having a constant optical intensity.

Reproduced signal E2, which is output form the optical detector in optical head 2 at the time of information reproducing, is supplied to information reproduction processor 11. Processor 11 provides reproduced signal information E11 in accordance with reproduced signal E2 supplied from optical head 2.

Information reproduction processor 11 is formed of comparator (digitizer) 3, data PLL circuit 4, demodulator 5, sync code detector 6, window signal generator 7, slice level compensator 8P, error sync code detector 8D, slice level controller 9, and write area detector 10.

Comparator 3 converts the analog current value of reproduced signal E2 from optical head 2 into an analog voltage signal, and amplifies the analog voltage signal. Then, comparator 3 digitizes the analog voltage signal with slice level E9 obtained from slice level controller 9, so as to provide digitized signal E3. Digitized signal E3 is supplied to data PLL circuit 4, write area detector 10, and slice level controller 9.

Write area detector 10 detects from digitized signal E3 the write area of information containing said preamble part and data part, and generates write area signal E10. Write area signal E10 is supplied to slice level compensator 8P, error sync code detector 8D, and slice level controller 9.

Data PLL circuit 4 includes a voltage controlled oscillator (VFO), a phase comparator, a low-pass filter, and other associated circuit elements. Based on digitized signal E3 from comparator 3, data PLL circuit 4 separately generates self clock signal E4B, channel data E4A whose phase is synchronized to self clock signal E4B, and charge width signal E4C representing a phase difference between self clock signal E4B and the leading/trailing edge of digitized signal E3 (having a rectangular waveform).

Channel data E4A and self clock signal E4B form data PLL circuit 4 are supplied to sync code detector 6 and error sync code detector 8D. Charge width signal E4B from circuit 4 is supplied to slice level controller 9.

Self clock signal E4B is supplied also to window signal generator 7 and slice level compensator 8P.

Demodulator 5 demodulates channel data E4A from data PLL circuit 4 in accordance with self clock signal E4B, and supplies an external device (not shown) with digital information contained in channel data E4A as reproduced signal information E11.

Sync code detector 6 detects the sync code contained in the data part of each block as shown in FIG. 7A, and supplies sync code detection signal E6 to window signal generator 7.

Window signal generator 7 predicts the position of the subsequent sync code with reference to the signal edge of sync code detection signal E6, and generates sync window prediction signal E7 at the predicted position. The signal width of sync window prediction signal E7 is slightly wider than that of the sync code which will be detected at the predicted position, and sync window prediction signal E7 is supplied to sync code detector 6 and error sync code detector 8D.

Error sync code detector 8D changes slice level B9 by a predetermined amount when error sync code being different from a normal sync code is detected, according to sync window prediction signal E7, channel data E4A, and self clock signal E4B, at the position of the sync codes which are contained in the data of respective blocks with predetermined intervals.

More specifically, when the error sync code is detected due to a much higher slice level (E9), error sync code detector 8D generates slice level downward compensation signal E8B in order to decrease the slice level (E9) by a predetermined amount. When the error sync code is detected due to a much lower slice level (E9), error sync code detector 8D generates slice level upward compensation signal E8A in order to increase the slice level (E9) by a predetermined amount. Slice level upward compensation signal E8A and slice level downward compensation signal E8B are supplied to slice level controller 9.

Slice level compensator 8P detects the preamble part of the block in accordance with digitized signal E3 from comparator 3 and with self clock signal E4B from data PLL circuit 4. When the preamble part is detected, compensator 8P supplies slice level controller 9 with slice level compensation signal E8P for the preamble part.

Slice level controller 9 determines slice level E9 in accordance with digitized signal E3 from comparator 3, charge width signal E4C from data PLL circuit 4, write area signal E10 from write area detector 10, slice level compensation signal E8P from slice level compensator 8P, and slice level upward/downward compensation signals E8A/E8B from error sync code detector 8D. Based on slice level E9 thus determined, comparator 3 digitizes reproduced signal E2.

FIG. 2 shows examples of sync code detector 6 and window signal generator 7 in FIG. 1. Channel data E4A from data PLL circuit 4 is a signal having a logic level of "1" or "0" which varies in response to the level change of digitized signal E3. The bit train of "1"/"0" of channel data E4A, representing the contents of digitized signal E3, is fetched to shift register 60 of FIG. 2 in synchronized to self clock signal E4B.

Data E60 fetched in shift register 60 is sequentially input to comparator 64 in unit of, for example, 12-bit parallel data. Comparator 64 also receives predetermined sync code D2, as comparison data, from sync code generator 62. Comparator 64 compares sync code D2 with data E60 which varies in accordance with the contents of channel data E4A at the timing of self clock signal E4B.

At the time when data E60 matches code D2 during the period of generation of sync window prediction signal E7 (which will be described later), comparator 64 detects the sync code of the data part, as shown in FIG. 7A and 7B, from channel data E4A. When the sync code is detected, comparator 64 provides sync code detection signal E6.

Sync code detection signal E6 is supplied to a reset input of 12-bit counter 70. Counter 70 receives self clock signal E4B as a clock input. When counter 70 is reset by the falling edge of signal E7, it starts to count self clock signal E4B (cf. FIG. 7C and 7D).

The count outputs (Q0–Q11) of counter 70 are input to comparison circuit 72. Also input to counter 72 are two comparison data C1 and C2.

Figure 7:
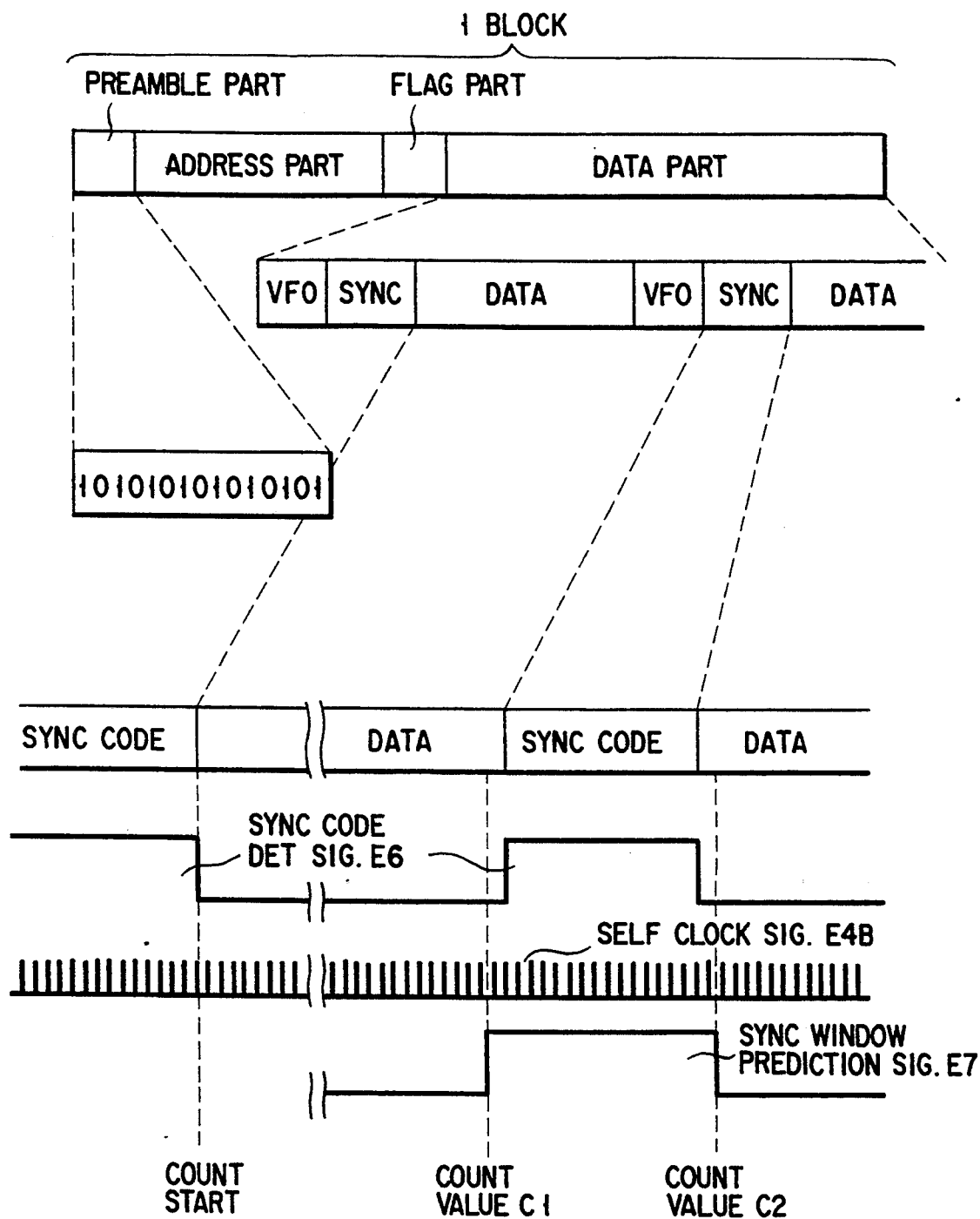
FIG. 7 shows an example of a format of information recorded on an optical disc shown in FIG. 1, and an example of a signal for detecting a sync code included in a data part of the information.

In the data part shown in FIG. 7, the length of each of the data and the sync code is predetermined. (For instance, the data is 456-bit length and the sync code is 12-bit length.) Therefore, the period of generation of the sync code can be predicted on the basis of the range of count values of counter 70 which starts the count from the falling edge of signal E7. Assume that the values of comparison data C1 and C2 are so selected that the count range based on C1 and C2 can cover the 12-bit width of the sync code. Then, comparison circuit 72 can detect the existence of the sync code when the count outputs (Q0–Q11) of counter 70 correspond to the count values defined by comparison data C1 and C2.

More specifically, a detection of the sync code can be predicted when the count value of counter 70 falls within the range of 456 to 468 (=456+12). If, for example, a margin of 3 bits is given to each of the leading and trailing edge of the sync code, comparison data C1 may be 453 (=456−3) and comparison data C2 may be 471 (=468+3). When such comparison data (C1 =453; C2=471) are used, comparison circuit 72 can reliably detect the position of the sync code.

Thus, information at the front and rear of the sync code is masked with data C1 and C2, and comparison circuit 72 can provide sync window prediction signal E7 which is a window signal for accurately extracting the sync code from others.

FIG. 3 shows an example of write area detector 10 in FIG. 1. Digitized signal E3 from comparator 3 is input to inverter 100 of an output-inverting type. Inverter 100 has an input hysteresis characteristic. Output E100 from inverter 100 is supplied to a network circuit comprising resistors R100, R102, diode D100, and capacitor C100. Capacitor C100 is charged in accordance with the potential of output E100 so as to provide charged potential E102. Potential E102 is applied to inverter 102 of an input-inverting type, having an input hysteresis characteristic. Inverter 102 outputs write area signal E10 having a potential being anti-phasic to potential E102.

In the network circuit of FIG. 3, when digitized signal E3 rises, output E100 falls. Then, capacitor C100 charged at potential E102 is discharged via a series circuit (small resistance) of resistor R100 and forwardly biased diode D100. In this case, since the discharge time constant is small, potential E102 is decreased quickly so that write area signal E10 instantly rises.

Meanwhile, when digitized signal E3 falls, output E100 rises. At this time, the internal resistance of diode D100 becomes substantially infinite because it is reversely-biased. Then, capacitor C100 is charged via a series circuit (extremely large resistance) of resistor R100 and reversely-biased diode D100. In this case, since the charge time constant is quite large, potential E102 cannot be readily increased.

After all, during when the charging/discharging for capacitor C100 is repeated with digitized signal E3 whose a level changing period is smaller than the charge time constant for capacitor C100, potential E102 cannot be a high level and, therefore, write area signal E10 output from inverter 102 retains its high level. Thus, inverter 102 continues to provide high-level write area signal E10 so long as digitized signal E3 is provided.

FIG. 8 exemplifies the signal waveform reproduced from optical disk 1, the digitized signal waveform, the slice level control signal waveform, and the slice level. FIG. 8A shows slice level E9 for digitizing the preamble part and the data part of signal E2 reproduced from optical disk 1. FIG. 8B shows digitized signal E3 obtained by digitizing reproduced signal E2 with slice level E9. FIG. 8C shows slice level control signal EX, detected at the preamble part and the data part of signal E2, which is not yet smoothed (or not yet averaged). FIG. 8D shows slice level E9 obtained after smoothing (or averaging) the slice level control signal.

FIG. 4 exemplifies slice level compensator 8P in FIG. 1. Digitized signal E3 as shown in FIG. 8B is fetched into shift register 80 in synchronized to self clock signal E4B. Parallel data E80 fetched in shift register 80 is sequentially input to comparator 82 in unit of, for example, 5 bytes. Comparator 82 receives, as comparison data, predetermined preamble code PD from preamble code generator 81.

Comparator 82 compares code PD with data E80 which varies in accordance with the contents of digitized signal E3 at the timing of self clock signal E4B. When data E80 matches code PD, comparator 82 supplies preamble code detection signal E82 to slice level compensation signal generator 83.

Slice level compensation signal generator 83 is formed of 3-inputs AND gate 831, 3-inputs NAND gate 832, inverter 833, diode 835, diode 836, and resistor 837.

Preamble code detection signal E82 from comparator 82 is input to AND gate 831 and NAND gate 832. Also input to these gates is write area signal E10 from write area detector 10. Digitized signal E3 from comparator 3 is input to AND gate 831, and is level-inverted inverter 833. Inverter 833 supplies the level-inverted digitized signal to NAND gate 832.

AND gate 831 provides a high level (+5 V) output when the AND condition of the 3 inputs is established, and provides a low level (0V) output when the AND condition of the 3 inputs is not established. The output of gate 831 is supplied to one end of resistor 837, via the anode-cathode path of diode 835. NAND gate 832 provides a low level (0V) output when the NAND condition of the 3 inputs is established, and provides a high level (+5 V) output when the NAND condition of the 3 inputs is not established. The output of gate 832 is supplied to one end of resistor 837, via the cathode-anode path of diode 836. The outputs of gates 831 and 832 are combined with each other at the one end of resistor 837, and the other end thereof provides slice level compensation signal E8P for the preamble part. Signal E8P corresponds to slice level control signal EX for the preamble (FIG. 8C) which is not yet smoothed or averaged.

FIG. 11 exemplifies how digitized signal E3 varies if slice level E9 is deviated largely from normal level L2 toward the upper or lower direction, due to a large amplitude variation of signal E2 reproduced from optical disk 1 in FIG. 1.

When slice level E9 has normal level L2 (FIG. 11A), digitized signal E3 also has normal waveform E3-2 (FIG. 11B). It can be determined that a part of data D2 corresponding to the signal edge of normal waveform E3-2 is set to "1" while other parts thereof are set to "0" (FIG. 11C). Such data D2 can be used for detecting a normal sync code.

When slice level E9 has upward error slice level L1 (FIG. 11A), digitized signal E3 becomes abnormal waveform E3-1 (FIG. 11B). It can be determined that a part of data D1 corresponding to the signal edge of abnormal waveform E3-1 is set to "1" while other parts thereof are set to "0" (FIG. 11C). Such data D1 can be used for detecting an abnormal sync code obtained when slice level E9 is erroneously deviated to the higher level side.

When slice level E9 has downward error slice level L3 (FIG. 11A), digitized signal E3 becomes abnormal waveform E3-3 (FIG. 11B). It can be determined that a part of data D3 corresponding to the signal edge of abnormal waveform E3-3 is set to "1" while other parts thereof are set to "0" (FIG. 11C). Such data D3 can be used for detecting an abnormal sync code obtained when slice level E9 is erroneously deviated to the lower level side.

Figure 12:
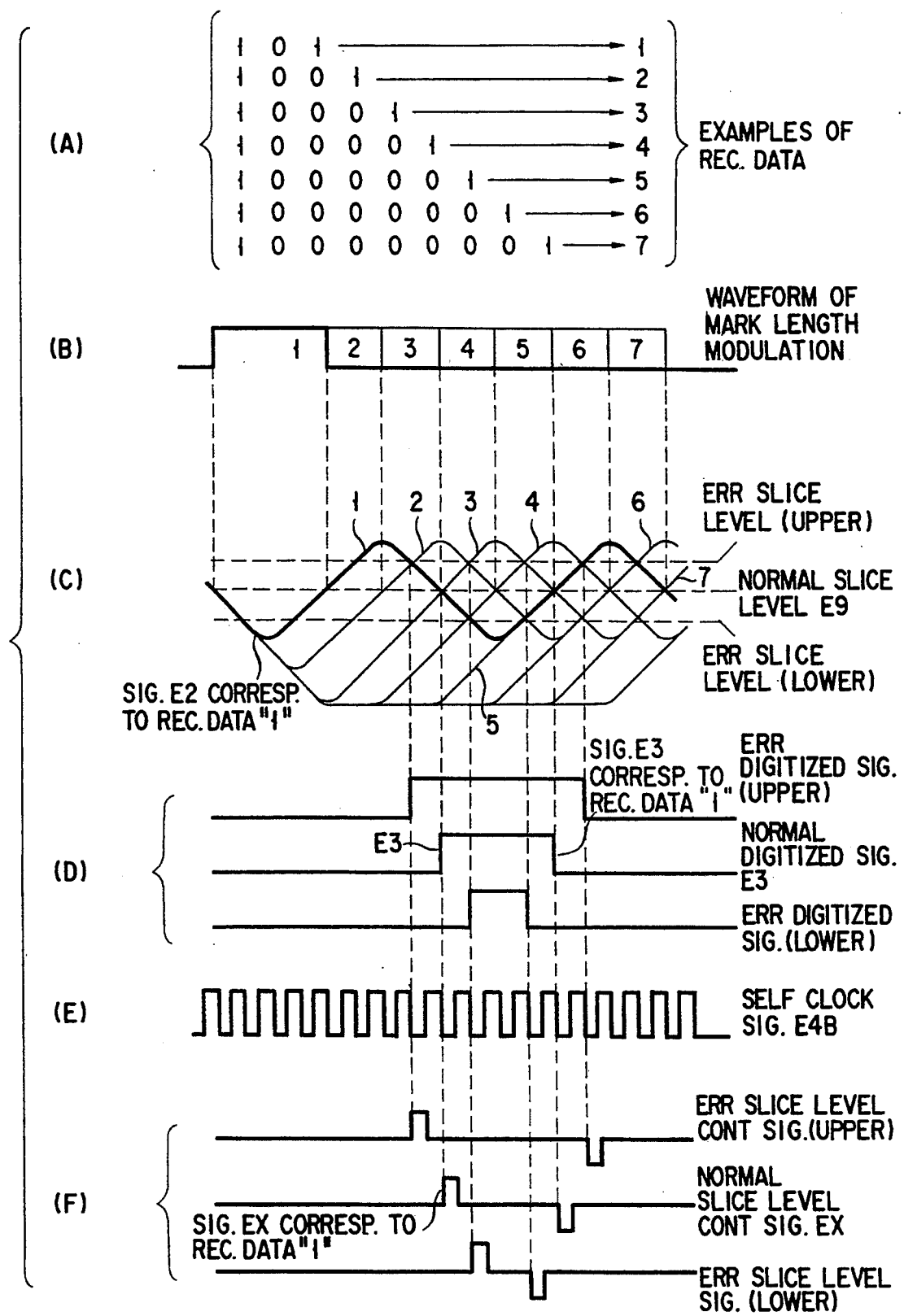
FIG. 12 is a waveform figure showing examples of data (1–7) in the mark-length recording system and marklength modulation waveforms corresponding thereto, for explaining what digitized signal and slice level control signal are obtained when the amplitude of the reproduction signals corresponding to the modulation waveforms have varied greatly.

FIG. 12 shows examples of data (1-7) for the mark length recording scheme and the corresponding mark length modulation waveforms. FIG. 12 further illustrates how digitized signal E3 and slice level control signal EX vary if the amplitude of reproduced signal E2 corresponding to the mark length modulation waveform is largely deformed.

More specifically, the recording data of "1" to "7" as shown in FIG. 12A are mark-length modulated (FIG. 12B) so as to record these data on optical disk 1. The waveforms of signal E2 reproduced from this disk 1 are shown in FIG. 12C. Assume that the waveform of recording data "1" is the current waveform. Under this assumption, when slice level E9 is the normal level (L2 in FIG. 11A), correct digitized signal E3 can be obtained (FIG. 12D). When the signal edges of correct digitized signal E3 are detected according to self clock signal E4B (FIG. 12E), correct slice level control signal EX can be obtained (FIG. 12F).

If slice level E9 is abnormal (L1 or L3 in FIG. 11A), erroneous digitized signal E3 is obtained (FIG. 12D). When the signal edges of erroneous digitized signal E3 are detected according to self clock signal E4B (FIG. 12E), erroneous slice level control signal EX (upper or lower signal in FIG. 12F) is generated.

Erroneous slice levels L1 and L3 caused by such erroneous slice level control signal EX can be corrected by slice level upward compensation signal E8A and slice level downward compensation signal E8B generated by error sync code detector 8D.

FIG. 5 is an example of error sync code detector 8D shown in FIG. 1. Channel data E4A obtained from the data part of reproduced signal E2 in FIG. 8A is fetched into shift register 84 in synchronized to self clock signal E4B. Parallel data E84 fetched in shift register 84 is sequentially input to comparators 86 and 87 in unit of, for example, 12 bits.

Comparator 86 receives as, a comparison data, downward error sync code detection data D3 (FIG. 8C) from error sync code generator 85. Comparator 87 receives as, a comparison data, upward error sync code detection data D1 (FIG. 8C) from error sync code generator 85.

Comparator 87 compares data D1 with data E84 which varies in accordance with the contents of channel data E4A at the timing of self clock signal E4B. When data E84 matches data D1, comparator 87 generates coincidence signal E87. Coincidence signal E87 triggers timer 88 so that timer 88 generates upward error sync code detection signal S1 having a high level for a predetermined period of time. This predetermined period of time can be determined by experience. Upward error sync code detection signal S1 is supplied to slice level compensation signal generator 89.

Comparator 86 compares data D3 with data E84 which varies in accordance with the contents of channel data E4A at the timing of self clock signal E4B. When data E84 matches data D3, comparator 86 supplies downward error sync code detection signal S2 to slice level compensation signal generator 89.

Slice level compensation signal generator 89 is formed of 3-inputs AND gate 891, 3-inputs NAND gate 892, diode 893, diode 894, resistor 895, and resistor 896.

Upward error sync code detection signal S1 from timer 88 is input to AND gate 891, and downward error sync code detection signal S2 from comparator 86 is input to NAND gate 892. Also input to these gates is write area signal E10 from write area detector 10 and sync window prediction signal E7 from window signal generator 7.

AND gate 891 provides a high level (+5 V) output when the AND condition of the 3 inputs is established, and provides a low level (OV) output when the AND condition of the 3 inputs is not established. The output of gate 891 is supplied to one end of resistor 895, via the anode-cathode path of diode 893. NAND gate 892 provides a low level (OV) output when the NAND condition of the 3 inputs is established, and provides a high level (+5 V) output when the NAND condition of the 3 inputs is not established. The output of gate 892 is supplied to one end of resistor 896, via the cathode-anode path of diode 894.

Slice level upward compensation signal E8A for the data part is obtained from the other end of resistor 896, and slice level downward compensation signal E8B for the data part is obtained from the other end of resistor 895. Compensation signals E8A and E8B are supplied to slice level controller 9 wherein these compensation signals are used for compensating slice level E9.

FIG. 6 is an example of slice level controller 9 in FIG. 1. Digitized signal E3 from comparator 3, charge width signal E4C from data PLL circuit 4, and write area signal E4C from write area detector 10 is supplied to slice level compensation signal generator 90.

Slice level compensation signal geneator 90 is formed of 3-inputs AND gate 901, 3-inputs NAND gate 902, inverter 903, diode 905, diode 906, and resistor 907.

Charge width signal E4C and write area signal E10 are input to AND gate 901 and NAND gate 902. Digitized signal E3 is input to AND gate 901, and an inverted signal which is obtained from signal E3 via inverter 903 is input to NAND gate 902.

AND gate 901 provides a high level (+5V) output when the AND condition of the 3 inputs is established, and provides a low level (OV) output when the AND condition of the 3 inputs is not established. Output EXP of gate 901 is supplied to one end of resistor 907, via the anode-cathode path of diode 905. NAND gate 902 provides a low level (OV) output when the NAND condition of the 3 inputs is established, and provides a high level (+5V) output when the NAND condition of the 3 inputs is not established. Output EXN of gate 902 is supplied to one end of resistor 907, via the cathode-anode path of diode 906. Outputs EXP and EXN of gates 901 and 902 are combined with each other at the one end of resistor 907, and the other end thereof provides the slice level control signal for the data part.

Slice level compensation signal E8P for the preamble part from slice level compensation signal generator 83 in FIG. 4, the slice level compensation signal (EXP+EXN) for the data part from slice level compensation signal generator 90 in FIG. 6, and slice level compensation signals E8A and E8B from slice level compensation signal generator 89 in FIG. 5, are added each other at the wired-OR circuit portion in FIG. 6, and the resultant slice level compensation signal obtained by the addition becomes slice level control signal EX before subjected to the smoothing (or averaging).

The above slice level control signal (EX) is applied to smoother 94 via switch 92. Also applied to smoother 94 is a predetermined fixed slice level (+2.5 V) which is obtained from voltage source 96 via switch 92. Switch 92 is controlled by write area signal E10. Switch 92 allows only signal EX to pass therethrough if signal E10 has a high level (i.e., during the write area), and allows only the fixed slice level to pass therethrough if signal E10 has a low level (i.e., other than the write area).

Smoother 94 is formed of operational amplifier 941, integration capacitor 942, and reference voltage source 943. Reference voltage source 943 applies a reference voltage of +2.5 V to the non-inverting input of operational amplifier 941. The output of operational amplifier 941 is fed back to it inverting input via capacitor 942, thereby constituting an integrator.

On the basis of the feedback operation of the integrator, when slice level control signal EX is input thereto, the integrator operates such that the inverting input voltage of amplifier 941 is converged (or imaginary shorting) to the reference voltage of +2.5 V.

More specifically, when control signal EX is less than 2.5 V, the integrator of smoother 94 provides slice level E9 having an incremental potential so that the inverting input voltage of amplifier 941 becomes 2.5 V. When control signal EX is more than 2.5 V, the integrator of smoother 94 provides slice level E9 having a decremental potential so that the inverting input voltage of amplifier 941 becomes 2.5 V. The above incremantal and decremental potentials at the output of the integrator are averaged by the integrating operation (i.e., changes in control signal EX are smoothed), so that ripple-free slice level E9 can be obtained.

By the aforementioned slice level control signal EX, the following controls are performed:
1) to determine the slice level of the preamble part on the basis of the average value of the digitized signal,
2) to determine the slice level so as to reduce the charge width signal in the data part, and
3) to change the slice level by a predetermined amount when the error sinc code in the data has been detected.

First, the control operation (1) will be described. This control is effected by the circuit 83 shown in FIG. 4.

FIG. 9 shows the relationship between the waveform of the preamble part of the reproduced signal read out from the optical disc shown in FIG. 1, the digitized signal waveform thereof, and the slice level control signal waveform. FIG. 9 illustrates the digitized slice level setting operation in the preamble part of the reproduced signal E2.

FIG. 9A shows an exact slice level VS for the preamble part of the reproduced signal E2, and an upward slice level VH displaced upward from the exact slice level VS or a downward slice level VL displaced downward from the exact slice level VS. FIG. 9B shows a digitized signal E2 as sliced by the exact slice level VS. FIG. 9C shows a slice level control signal EX, before smoothed (averaged), detected by a preamble part slice level correction circuit 8P.

FIG. 9D shows a digitized signal E3 as sliced at a position of level VH of FIG. 9A, and FIG. 9E shows a slice level control signal EX before smoothed in this case. When the control signal EX is measured at a reference circuit with a zero potential, its average value is less than 2.5 V. The control signal EX is input to a smoothing circuit having a frequency band characteristic determined by a resistor 837 and a capacitor 942. The smoothing circuit is of the inverse amplification type, and 2.5 V is applied to its non-inversion input. Thus, its output has a smoothed slice level higher than 2.5 V.

When the signal EX is input to an integrator of the smoothing circuit 94 of FIG. 6, the slice level E9 or the output of the integrator falls. By the falling of the slice level E9, the upward slice level VH of FIG. 9A is restored to the exact slice level VS.

FIG. 9F shows a digitized signal E3 as sliced at a position of the level VH of FIG. 9A, and FIG. 9G shows a control signal EX of the slice level before smoothed in this case. When the control signal EX is measured at a reference circuit with zero potential, its average value is more than 2.5 V. The control signal EX is input to a smoothing circuit having a frequency band characteristic determined by the resistor 837 and the capacitor 942. The smoothing circuit is of the inverse amplification type, and 2.5 V is applied to its non-inversion input. Thus, its output has a smoothed slice level lower than 2.5 V.

When the signal EX is input to the integrator of the smoothing circuit 94 of FIG. 6, the slice level E9 or the output of the integrator rises. By the rising of the slice level E9, the downward slice level VL of FIG. 9A is restored to the exact slice level VS.

The aforementioned control operation (2) will now be described. This control is effected by the circuit 90 in FIG. 6.

Figure 10:
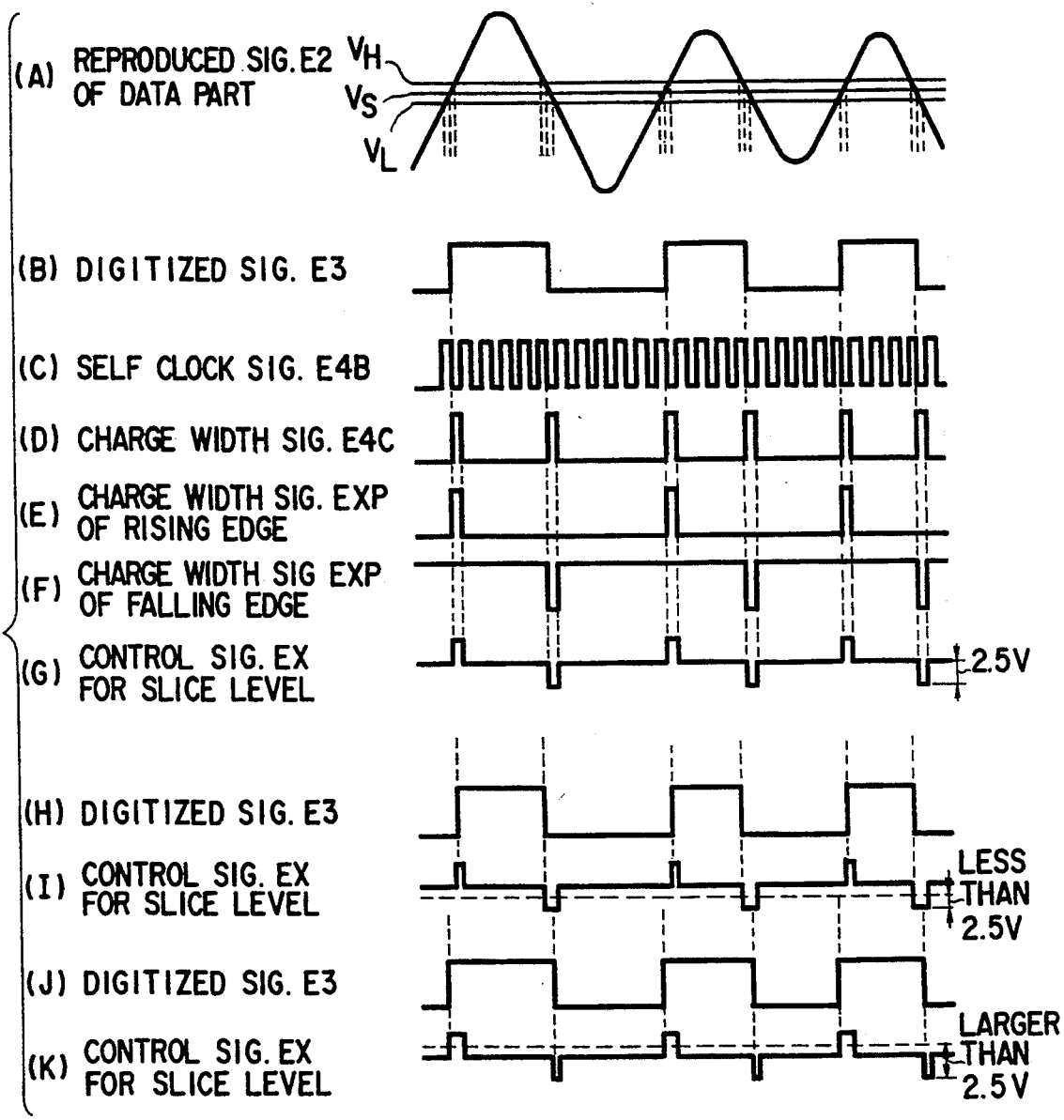
FIG. 10 illustrates the relationship between a waveform of a data part of a reproduction signal read out from the optical disc shown in FIG. 1, a digitized signal waveform thereof, and a slice level control signal waveform.

FIG. 10 shows the digitized slice level setting operation in the data part shown in FIG. 10. FIG. 10A shows shows an exact slice level VS for the data part of the reproduced signal E2, and an upward slice level VH displaced upward from the exact slice level VS or a downward slice level VL displaced downward from the exact slice level VS.

FIG. 10B shows a digitized signal E3 as sliced at a position of level VS of FIG. 10A. FIG. 10C shows a self-lock signal E4B of the data PLL circuit 4. FIG. 10D shows a charge width signal E4C extracted from the data PLL circuit 4. FIG. 10E shows a charge width signal (EXP in FIG. 6) of only a rising edge portion of the digitized signal E3 in the charge width signal E4C. FIG. 10F shows a phase-inverted charge width signal (EXN in FIG. 6) of only a falling edge of the digitized signal E3 in the charge width signal E4C. FIG. 10G shows a slice level control signal EX formed by synthesizing the charge width signal EXP of the rising edge portion and the charge width signal EXN of the falling edge portion.

FIG. 10H shows a disgitized signal E3 as sliced at a position of level VH of FIG. 10A, and FIG. 10I shows a slice level control signal EX before smoothed in this case.

When digitization is effected at level VH slightly higher than the normal level, the signal width of the digitized signal E3 (FIG. 10B) is slightly narrowed. The phase difference between the digitized signal E3 and the self-clock signal E4B at this time differs slightly from that at the time of the normal slice level. Specifically, as shown in FIG. 10I, the pulse width of the rising portion of the slice level control signal EX becomes narrow, while the pulse width of the rising portion of the slice level control signal EX becomes wider. The average level of the control signal EX is slightly lower than 2.5 V at the time of the normal slice level. The control signal EX is input to the smoothing circuit having a frequency band characteristic determined by the resistor 907 and the capacitor 942. The smoothing circuit is of the inverse amplification type, and 2.5 V is applied to its non-inversion input. Thus, its output has a smoothed slice level higher than than 2.5 V.

When the signal EX is input to the integrator of the smoothing circuit 94 of FIG. 6, the slice level E9 or the output of the integrator falls. By the falling of the slice level E9, the upward slice level VH of FIG. 10A is restored to the exact slice level VS.

FIG. 10J shows a digitized signal E3 as sliced at a position of level VL of FIG. 10A, and FIG. 10K shows a slice level control signal EX before smoothed in this case.

When digitization is effected at level VL slightly lower than the normal level, the signal width of the digitized signal E3 (FIG. 10B) is slightly increases. Specifically, as shown in FIG. 10K, the pulse width of the rising portion of the slice level control signal EX becomes wide, while the pulse width of the rising portion of the slice level control signal EX becomes narrow. The average level of the control signal EX is slightly higher than 2.5 V at the time of the normal slice level. The control signal EX is input to the smoothing circuit having a frequency band characteristic determined by the resistor 907 and the capacitor 942. The smoothing circuit is of the inverse amplification type, and 2.5 V is applied to its non inversion input. Thus, its output has a smoothed slice level lower than than 2.5 V.

When the signal EX is input to the integrator of the smoothing circuit 94 of FIG. 6, the slice level E9 or the output of the integrator rises. By the falling of the slice level E9, the downward slice level VL of FIG. 10A is restored to the exact slice level VS.

Finally, the control operation (3) will be described. This control is effected by the circuit 89 of FIG. 5.

When the comparator 87 of FIG. 5 has detected an error sync code at a upward slice level L1 (FIG. 11A) in the data part of the reproduced signal E2, the signal S1 has a high level for a predetermined time period. While the error sync code is being detected, the sync window estimation signal E7 and write area signal E10 have high levels and the AND gate 891 outputs a high level (+5 V) signal.

The 5 V output signal passes through the forwardly biased and turned-on diode 893 and resistor 895 and becomes a slice level downward correction signal E8B, which is then applied to the inversion input of an operational amplifier 941 constituting an integrator of the smoothing circuit 94 of FIG. 6. Then the inversion input potential of the operational amplifier 941 tends to rise due to the high level (+5 V) from the AND gate 891. However, by the feedback operation of the integrator, the inversion input of the operational amplifier 941 is imaginary-short-circuited to its non-inversion input. Thus, the operational amplifier 941 outputs a slice level E9 whose potential has been decreased to keep 2.5 V of the inversion input potential.

By the falling of slice level potential, the upward error slice level L1 which brought about the error sync code is lowered to the normal level L2.

When the comparator 87 of FIG. 5 has detected an error sync code at a downward slice level L3 (FIG. 11A) in the data part of the reproduced signal E2, the signal S1 has a high level for this time period. While the error sync code is being detected, the sync window estimation signal E7 and write area signal E10 have high levels and the AND gate 891 outputs a low level (O) signal.

The OV output signal passes through the forwardly biased and turned-on diode 894 and resistor 896 and becomes a slice level upward correction signal E8A, which is then applied to the inversion input of the operational amplifier 941 constituting the integrator of the smoothing circuit 94 of FIG. 6. Then the inversion input potential of the operational amplifier 941 tends to fall due to the low level (OV) from the AND gate 892. However, by the feedback operation of the integrator, the inversion input of the operational amplifier 941 is imaginary-short-circuited to its non-inversion input. Thus, the operational amplifier 941 outputs a slice level E9 whose potential has been increased to keep 2.5 V of the inversion input potential.

By the rising of slice level potential, the downward error slice level L3 which brought about the error sync code is increased to the normal level L2.

As has been described above, the apparatus of the embodiment of FIG. 1 can perform any of the three control operations: (1) to determine the slice level of the preamble part on the basis of the average value of the digitized signal, (2) to determine the slice level so as to reduce the charge width signal in the data part, and (3) to change the slice level by a predetermined amount when the error sinc code in the data has been detected. When the control (1) is unnecessary, the correction circuit 8P is removed from the structure of FIG. 1. When the control (3) is unnecessary, the correction circuit 8D is removed from the structure of FIG. 1. When the control (2) is unnecessary, the correction signal generating circuit 90 is removed from the structure of FIG. 6.

According to the information reproducing apparatus of the present invention, the slice level of the digitizing means is changed on the basis of the charge width signal generated while the data of the data storing portion among information recorded on the optical disc is read. Thus, even if the amplitude center of a signal of the data part is displaced, the slice level is changed accordingly, and erroneous data reproduction can be prevented.

What is claimed is:

1. An information reproducing apparatus for reading out data from an information recording medium having a plurality of blocks each provided with a preamble part storing a predetermined code for synchronizing the blocks and a data part storing data, said apparatus comprising:
   read means for reading the predetermined code and the data stored in each block of the recording medium and outputting a read signal;
   digitizing means for digitizing the read signal output from the read means by comparing the read signal with a slice level to digitize the read signal;
   first changing means for changing the slice level on the basis of the digitized read signal digitized by the digitizing means, while the read means reads the predetermined code stored in the preamble part of the block;
   generating means for generating a charge width signal representing a phase difference between the digitized read signal and a self clock signal derived from the digitized read signal; and
   second changing means for changing the slice level changed by the first changing means on the basis of the charge width signal generated by the generating means, while the read means reads the data stored in the data part of the block.

2. The apparatus according to claim 1, wherein said first changing means includes calculation means for calculating an average value of the read signal digitized by the digitizing means, and means for setting the average value of the digitized signal calculated by the calculation means as the slice level of the digitizing means.

3. The apparatus according to claim 1, wherein said second changing means includes means for changing the slice level of the digitizing means on the basis of an average value of a first charge width signal generated by a rising edge portion of the digitized read signal, and a second charge width signal generated by a falling edge portion of the digitized read signal.

4. The apparatus according to claim 1, further comprising means for discriminating the state in which the read means reads the data stored in the preamble part of the block.

5. An information reproducing apparatus comprising:
   read means for reading data, which is stored in an information recording medium and includes synchronizing codes at predetermined intervals, and outputting a read signal;
   digitizing means for digitizing the read signal output from the read means by using a slice level;
   generating means for comparing the signal digitized by the digitizing means and clock signals output at predetermined intervals, thereby generating a charge width signal representing a phase difference between the digitized signal and the clock signals;
   first changing means for changing the slice level of the digitizing means on the basis of the charge width signal generated by the generating means, so as to reduce the charge width signal;
   detection means for detecting the synchronizing codes included in the digitized signal digitized by the digitizing means; and
   second changing means for changing the slice level of the digitizing means by a predetermined amount when the detection means has detected a code different from the synchronizing codes.

6. The apparatus according to claim 5, wherein said first changing means includes means for changing the slice level of the digitizing means on the basic of an average value of a first charge width signal generated by a rising edge portion of the digitized signal, and a second charge width signal generated by a falling edge portion of the digitized signal.

7. The apparatus according to claim 5, further comprising:
- means for providing first channel data corresponding to a first digitized signal obtained by digitizing a sync code portion of the read signal by a first slice level;
- means for providing second channel data corresponding to a second digitized signal obtained by digitizing a sync code portion of the read signal by a second slice level;
- means for providing third channel data corresponding to a third digitized signal obtained by digitizing a sync code portion of the read signal by a third slice level; and
- means for comparing information corresponding to the signal digitized by the digitizing means with the first, second and third channel data, and for determining that the sync code read by the detection means is an erroneous sync code unless the signal digitized by the digitizing means corresponds to the second channel data including information between the first and third channel data.

8. The apparatus according to claim 5, wherein said second changing means comprises:
- means for providing first channel data including information of a rising portion and a falling portion of a first digitized signal obtained by digitizing a sync code portion of the read signal by a first slice level;
- means for providing second channel data including information of a rising portion and a falling portion of a second digitized signal obtained by digitizing a sync code portion of the road signal by a second slice level;
- means for providing third channel data including information of a rising portion and a falling portion of a third digitized signal obtained by digitizing a sync code portion of the read signal by a third slice level; and
- means for comparing the information of the rising portion and falling portion of the signal digitized by the digitizing means with the first, second and third channel data, and for discriminating which of the first, second and third channel data corresponds to the signal digitized by the digitizing means;
- means for reducing the slice level of the digitizing means by a predetermined amount when the discrimination result of the discriminating means corresponds to the first channel data; and
- means for increasing the slice level of the digitizing means by a predetermined amount when the discrimination result of the discriminating means corresponds to the third channel data.

9. An information reproducing apparatus for reading out data from an information recording medium having a plurality of block units each provided with a preamble part storing a predetermined code for synchronizing the block units and a data storing portion storing data, said apparatus comprising:
- read means for reading the data stored in each block unit of the recording medium and outputting a read signal;
- digitizing means for digitizing the read signal output from the read means by using a slice level;
- setting means for setting the slice level of the digitizing means on the basis of the signal digitized by the digitizing means, while the data stored in the preamble part of the block unit is read by the read means;
- generating means for comparing the signal digitized by the digitizing means and clock signals output at predetermined intervals, thereby generating a charge width signal representing a phase difference between the digitized signal and the clock signals, while the data stored in the data storing portion of the block unit is read by the read means;
- first changing means for changing the slice level of the digitizing means on the basis of the charge width signal generated by the generating means, so as to reduce the charge width signal;
- detection means for detecting a sync code included in the digitized signal digitized by the digitizing means; and
- second changing means for changing the slice level of the digitizing means by a predetermined amount when the detection means has detected a code different from the sync code.

10. The apparatus according to claim 9, wherein
said information recording medium is composed of an optical disc on which information of said block unit is recorded by a mark-length recording system,
said read means includes an optical head which radiates a laser beam on the optical disc and detects a reflection beam thereof, thereby outputting a reproduction signal having an analog signal level corresponding to the information of the block unit,
said digitizing means includes a comparison circuit for comparing a signal level of the reproduction signal from the optical head with the slice level, thereby digitizing the reproduction signal and outputting a digitized signal,
said setting means includes a slice level correction circuit for correcting the slice level on the basis of the digitized signal, when the digitized signal includes data stored in the preamble part of the block unit,
said generating means includes a data PLL circuit for phase-locking the digitized signal and generating the clock signals, and generating a charge width signal representing a phase difference between the digitized signal and the clock signals and channel data including information representing a signal level change point of the digitized signal, when the digitized signal includes data stored in the data storing portion of the block unit,
said detection means includes a sync code detection circuit for comparing a predetermined sync code with the channel data, and outputting a sync code detection signal when the predetermined sync code coincides with the channel data,
said second changing means includes an erroneous sync code detection circuit for comparing first and second erroneous synchronizing codes with the channel data, generating a first slice level correction signal when the channel data corresponds to the first erroneous sync code, and generating a second slice level correction signal when the channel data corresponds to the second erroneous sync code, and
said first changing means includes a slice level control circuit for changing the slice level in response to the charge width signal, the slice level correction signal, the first slice level correction signal, and second slice level correction signal.

11. The apparatus according to claim 9, wherein paid first changing means includes means for changing the slice level of the digitizing means on the basis of an average value of a first charge width signal generated by a rising edge portion of the digitized signal, and a second charge width signal generated by a falling edge portion of the digitized signal.

12. The apparatus according to claim 9, further comprising:
means for providing first channel data corresponding to a first digitized signal obtained by digitizing a sync code portion of the read signal by a first slice level;
means for providing second channel data corresponding to a second digitized signal obtained by digitizing a sync code portion of the read signal by a second slice level;
means for providing third channel data corresponding to a third digitized signal obtained by digitizing a sync code portion of the read signal by a third slice level; and
means for comparing information corresponding to the signal digitized by the digitizing means with the first, second and third channel data, and for determining that the sync code read by the detection means is an erroneous sync code unless the signal digitized by the digitizing means corresponds to the second channel data including information between the first and third channel data.

13. The apparatus according to claim 9, wherein said second changing means comprises:
means for providing first channel data including information of a rising portion and a falling portion of a first digitized signal obtained by digitizing a sync code portion of the read signal by a first slice level;
means for providing second channel data including information of a rising portion and a falling portion of a second digitized signal obtained by digitizing a sync code portion of the read signal by a second slice level;
means for providing third channel data including information of a rising portion and a falling portion of a third digitized signal obtained by digitizing a sync code portion of the read signal by a third slice level; and
means for comparing the information of the rising portion and falling portion of the signal digitized by the digitizing means with the first, second and third channel data, and for discriminating which of the first, second and third channel data corresponds to the signal digitized by the digitizing means;
means for reducing the slice level of the digitizing means by a predetermined amount when the discrimination result of the discriminating means corresponds to the first channel data; and
means for increasing the slice level of the digitizing means by a predetermined amount when the discrimination result of the discriminating means corresponds to the third channel data.

14. An information reproducing apparatus for reading out data from an optical disc having, as data memory units, a plurality of block units each provided with a preamble part storing a predetermined code for synchronizing the block units and a data storing portion storing data, said optical disc storing data on the basis of the length and interval of pits, said apparatus comprising:
light emitting means for emitting a light beam to the optical disc, thereby forming pits on the optical disc;
control means for controlling the light emission operation of the light emitting means, and changing the length of the pits formed on the optical disc, thereby storing data on the optical disc;
read means for reading the data stored in the optical disc in units of a block, and outputting a read signal;
digitizing means for digitizing the read signal output from the read means by using a slice level;
setting means for setting the slice level of the digitizing means on the basis of the signal digitized by the digitizing means, while the data stored in the preamble part of the block unit is read by the read means;
generating means for comparing the signal digitized by the digitizing means and clock signals output at predetermined intervals, thereby generating a charge width signal representing a phase difference between the digitized signal and the clock signals, while the data stored in the data storing portion of the block unit is read by the read means;
first changing means for changing the slice level of the digitizing means on the basis of the charge width signal generated by the generating means, so as to reduce the charge width signal;
detection means for detecting a sync code included in the digitized signal digitized by the digitizing means; and
second changing means for changing the slice level of the digitizing means by a predetermined amount when the detection means has detected a code different from the sync code.

15. An apparatus for reproducing information from an information recording medium having a data storage portion in which are stored data and sync codes provided with predetermined intervals in the data storage portion, said apparatus comprising:
means for reading the data and the sync code from the recording medium to provide a read signal;
means for digitizing the read signal provided by said reading means based on a slice level to provide a digitized code;
means for presetting an error sync code different from the sync code stored in the recording medium;
detecting means for, when said reading means reads the sync code from the recording medium, detecting a coincidence between the digitized code provided by said digitizing means and the error sync code preset by said presetting means so as to provide a detection result representing the coincidence;
means for changing the slice level of said digitizing means in accordance with the detection result provided by said detecting means; and
means for generating a reproduced information output from the digitized code of said digitizing means, based on the slice level changed by said changing means.

* * * * *